(No Model.)
S. LANGFORD.
SULKY PLOW AND CULTIVATOR.
No. 324,849. Patented Aug. 25, 1885.
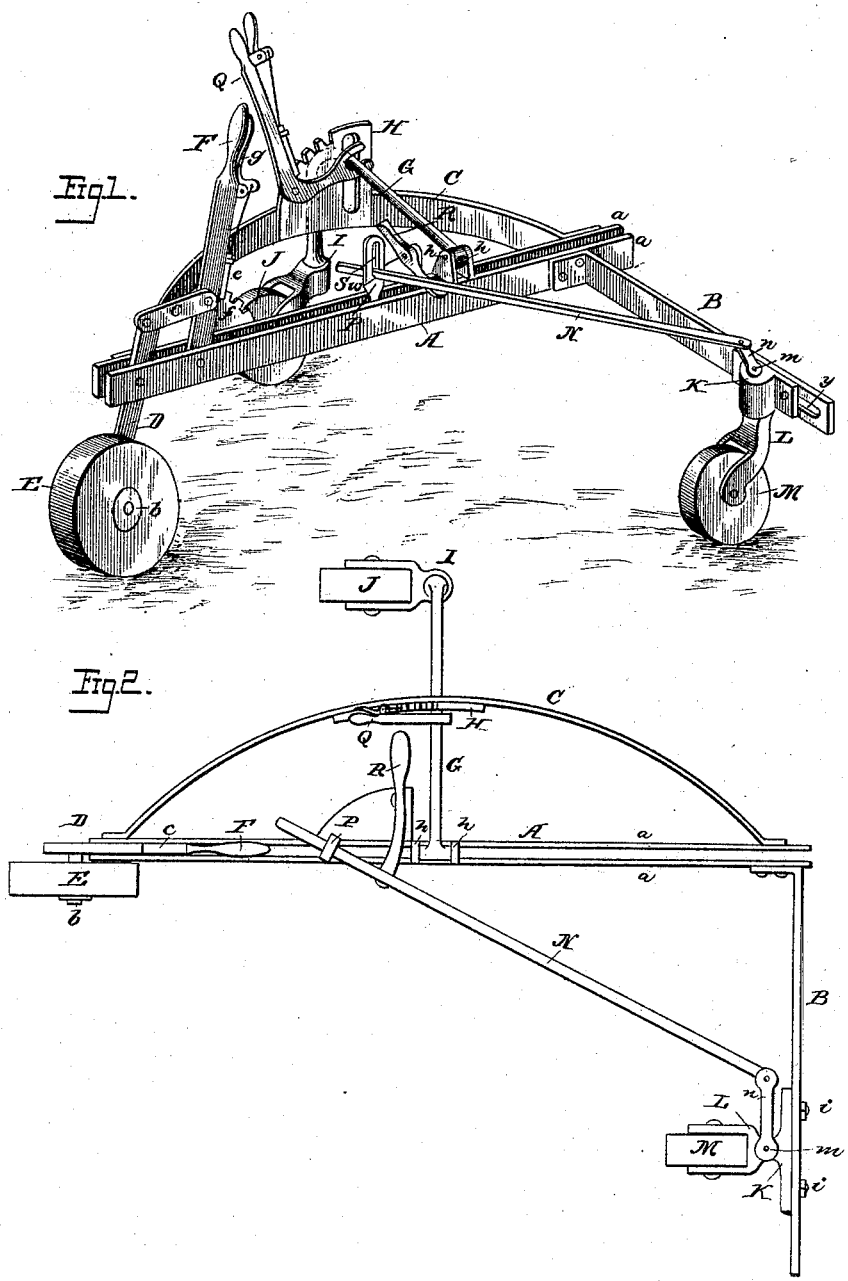
Attests:
John G. Hinkel
H. E. Hansmann
Inventor:
Simeon Langford
By Foster Freeman
Attorney

UNITED STATES PATENT OFFICE.

SIMEON LANGFORD, OF CYNTHIANA, INDIANA.

SULKY PLOW AND CULTIVATOR.

SPECIFICATION forming part of Letters Patent No. 324,849, dated August 25, 1885.

Application filed January 20, 1885. (No model.)

*To all whom it may concern:*

Be it known that I, SIMEON LANGFORD, a citizen of the United States, residing at Cynthiana, in the county of Posey and State of Indiana, have invented certain new and useful Improvements in Sulky Plows and Cultivators, of which the following is a specification.

My invention relates to that class of plows or cultivators in which a frame carrying one or more blades is supported by wheels provided with adjusting devices; and my invention consists in combining with the frame caster-wheels and adjusting and locking mechanism, as fully set forth hereinafter, so as to insure the direct course of the implement in plowing, facilitate the turning of the same, and enable the driver to readily adjust the frame to any desired height and angle.

In the drawings, Figure 1 is a perspective view showing the frame, supporting-wheels, and adjusting devices of my improved implement. Fig. 2 is a plan view.

The frame of the machine consists of a central beam, A, composed of two plates, $a\ a$, bolted to intervening distance-pieces, and arm B, extending at right angles to the beam A, near the forward end thereof, and a curved side bar or bracket, C.

A lever, D, is pivoted between the plates or pieces $a\ a$ of the beam near the rear end, and carries the journal $b$ of a roller, E, and a hand-lever, F, pivoted at the lower end between the plates $a\ a$, is connected to the upper end of the lever D by a link, $c$. The hand-lever F carries a bolt, $e$, adapted to notches in a curved plate, $f$, and operated, as usual, by means of a pivoted hand-piece, $g$, upon the handle of the lever.

To ears $h\ h$ upon the beam A, near the center, is pivoted the inner end of an L-shaped arm, G, which extends through a slot in a plate, H, supported by the bracket C, and carries at the lower end a swiveled bracket or caster-frame, I, in which turns a wheel, J.

The outer end of the arm B has a slot, $y$, for the passage of bolts $i$, which secure adjustably a bracket, K, supporting a shaft, $m$, having at the lower end a bracket or caster-frame, L, supporting a wheel, M, and at the upper end of the shaft $m$ is an arm, $n$, to which is connected a bar, N, which passes through a vertical slot, S, in a standard, P, upon the beam A.

At the under side of the bar N is a notch, $w$, adapted to engage with the standard P when the wheel M is parallel to the beam A, thereby retaining the wheel in a position to guide the machine in a straight course when it is being drawn forward.

A hand-lever, Q, provided with a usual locking-bolt, is pivoted to the plate H, and has an arm with a forked end embracing the arm G, and a foot-lever, R, is pivoted to a standard, $s$, and extends beneath the bar N.

The plows or cultivator-blades are secured to or hang beneath the beam A, as in other implements of this class, and I have therefore not thought it necessary to illustrate them.

By adjusting the hand-lever F the beam A may be raised and lowered, so as to regulate the depth to which the blades penetrate the earth, or to raise them entirely above the ground when the instrument is being moved from place to place.

By adjusting the hand-lever Q the frame of the implement may be tilted to one side or the other to any desired extent, so as to alter the angle of the blades and of the bearing-rails.

So long as the implement is to pursue a straight course, the bar N is locked in position; but when it is desired to turn to one side the driver places his foot upon the outer end of the lever R, and then raises the bar N until the notch $w$ is free from the standard P, when the shaft $m$ will be released and the frame L will swing according to the direction in which the instrument is moved, the wheel M acting as a caster-wheel and permitting the implement to be turned upon a very short curve, and the wheel J also acting as a caster-wheel to facilitate this movement.

When the instrument again takes a straight course, the wheel M will automatically adjust itself to a position parallel to the beam A, when the notch will engage with the standard and the wheel will be locked in position. The wheel M thus acts both as a caster-wheel in turning and as a guiding-wheel upon a rigid axle when the machine pursues a straight course.

If the horses should crowd the machine to one side, so as to tend to carry the lead-wheel into the furrow, the lever Q may be adjusted so as to incline the wheel M and cause it to tend to run up to the land, thus insuring a movement in the proper course.

The bracket K may be adjusted upon the arm B so as to set the wheel M for any width of furrow.

As the wheel J is carried by a caster-frame, it will tend to maintain its position upon the land, and will not drop back into the furrow.

Without limiting myself to the mode described of adjusting the caster-wheels, I claim—

1. The combination, with the frame of a plow or cultivator, of a rear supporting-wheel, E, and lateral wheels M and J, carried by caster-frames, and means for locking the frame of the wheel M in a position parallel to the line of draft, and for releasing the same when the instrument is to be turned, substantially as set forth.

2. The combination of the frame, rear supporting-wheel, E, caster-wheel J at one side, caster-wheel at the opposite side, and locking-bar N, connected to the caster-frame of the wheel M, and means for locking and releasing the said bar, substantially as set forth.

3. The combination, with the frame of a cultivator or plow, of a caster-wheel, M, a caster-frame, L, carried by a shaft provided with a crank, $m$, and a notched bar, N, connected to the crank and extending through a slot in a standard on the frame, substantially as set forth.

4. The combination, with the caster-wheel, frame, and notched bar N, of a foot-lever, R, substantially as set forth.

5. The combination, with the frame of a plow or cultivator, of a rear wheel, E, forward caster-wheel at one side, and means for locking and unlocking the frame thereof, and a caster-wheel, J, at the opposite side, carried by an adjustable arm, G, substantially as specified.

In testimony whereof I have signed my name to this specification in the presence of two subscribing witnesses.

SIMEON LANGFORD.

Witnesses:
J. M. STEWART,
T. H. ENDECOTT.